Aug. 18, 1970  E. EFFRON ET AL  3,524,731
MIXED-PHASE FLOW DISTRIBUTOR FOR PACKED BEDS
Filed Sept. 30, 1968  2 Sheets-Sheet 1
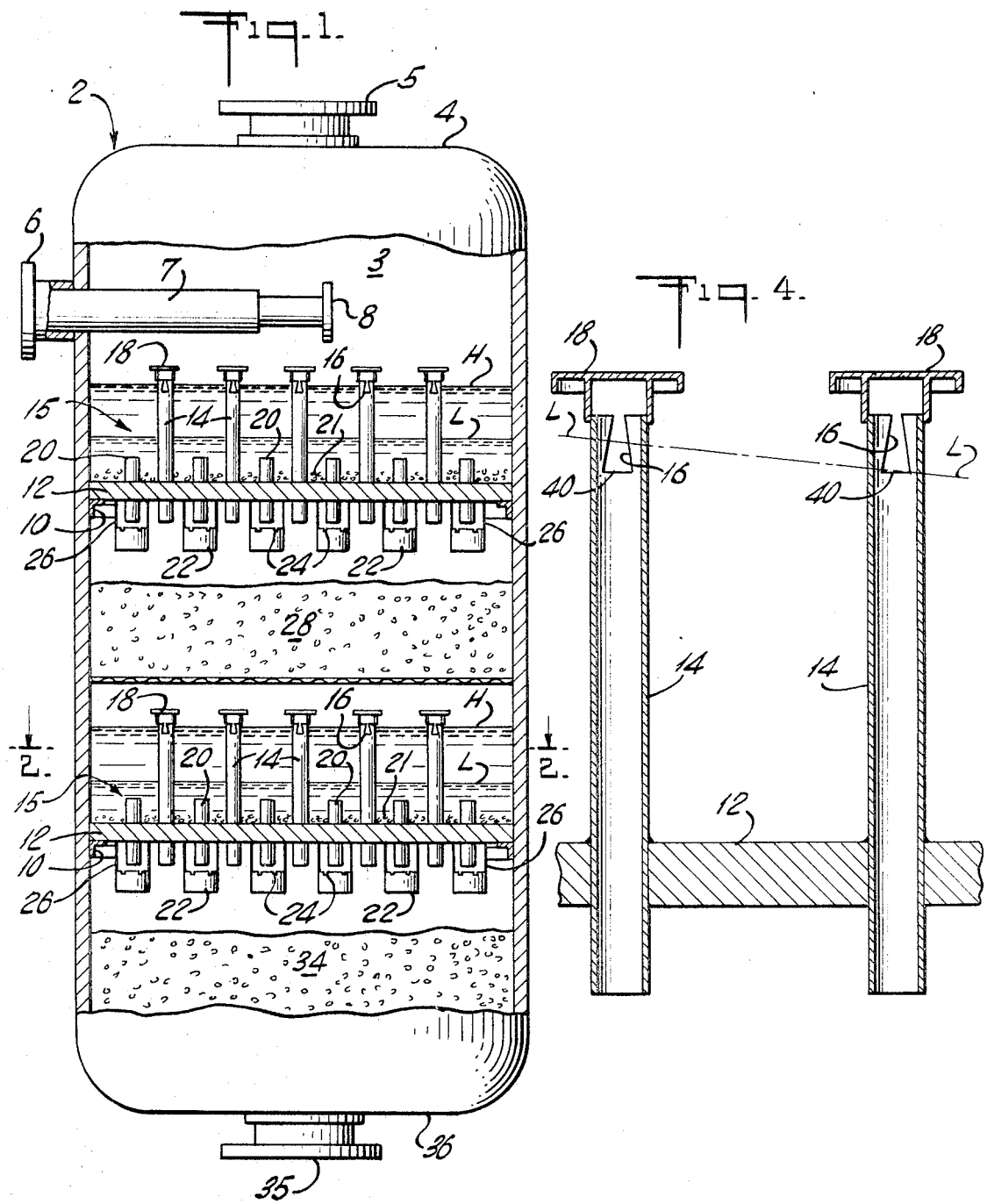
INVENTORS
EDWARD EFFRON
JACK M. HOCHMAN
BY
ATTORNEY

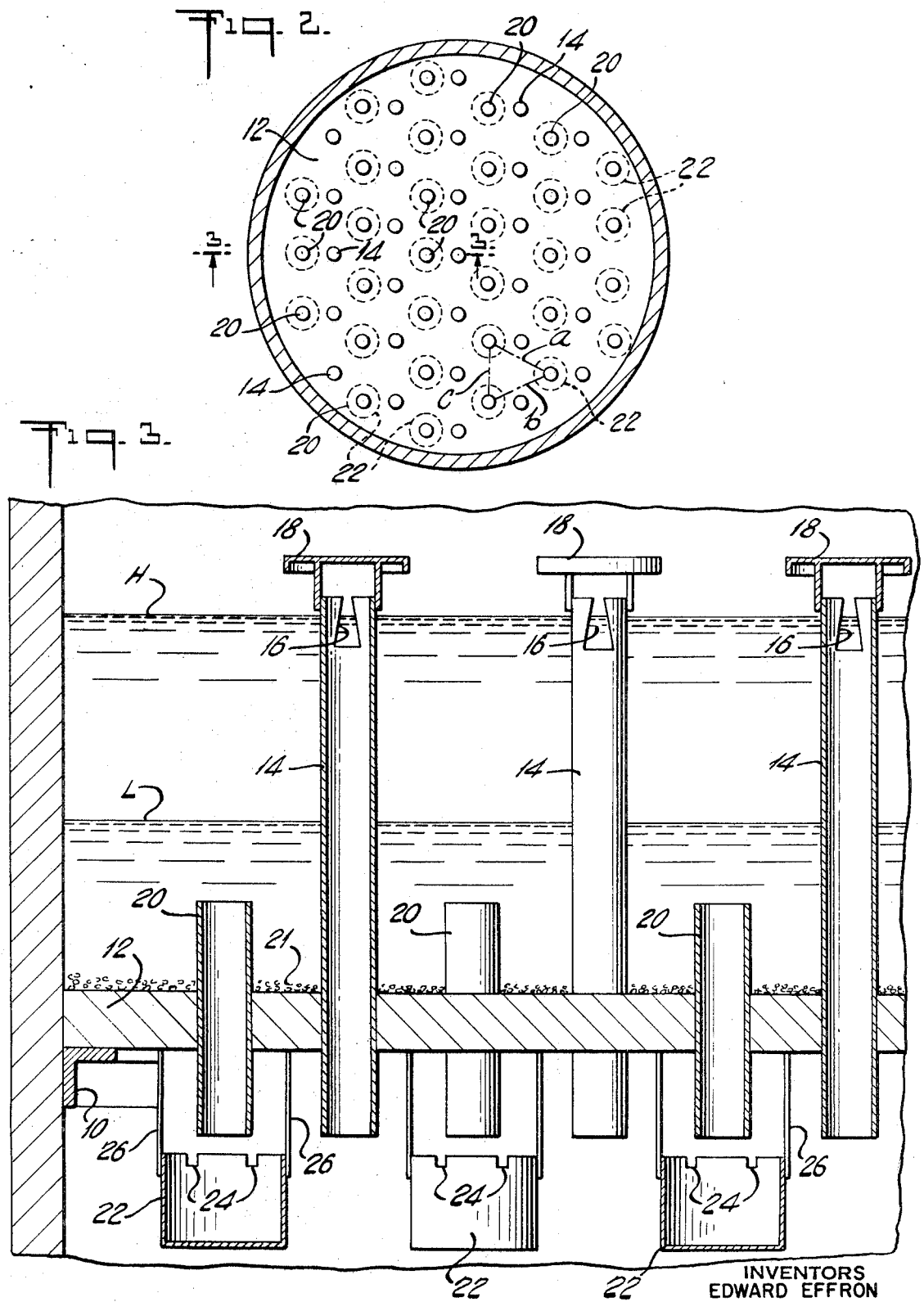

United States Patent Office 3,524,731
Patented Aug. 18, 1970

3,524,731
MIXED-PHASE FLOW DISTRIBUTOR FOR PACKED BEDS
Edward Effron, Springfield, and Jack M. Hochman, Boonton, N.J., assignors to Esso Research and Engineering Company, a corporation of Delaware
Filed Sept. 30, 1968, Ser. No. 763,770
Int. Cl. B01j 9/04; C10g 23/00
U.S. Cl. 23—288                           8 Claims

ABSTRACT OF THE DISCLOSURE

This invention is directed to an improved and novel distributor for use in packed end reactors wherein a mixed phase is to be passed through the bed. The distributor comprises a plate and a plurality of short tubes and a plurality of relatively longer notched tubes inserted through said plate. In a preferred embodiment, horizontal baffles are provided beneath each tube and cap plates are provided over the notched tubes.

BACKGROUND OF THE INVENTION

This invention relates generally to means and methods for distributing a vapor-liquid mixed phase feed to a granular solids contacting zone in a multibed reactor. More particularly, the invention relates to a new and improved method and apparatus for uniformly distributing mixed phases in a downflow catalytic contactor such as a hydrofiner reactor.

The distributor of the instant invention is characterized in having a small required height and, hence, contributes to substantial savings realizable as a result of being able to use shorter reactors. When it is realized that reactors of the type hereinabove mentioned may often cost between 20 and 30 thousand dollars per foot of reactor straight side, the magnitude of the savings is readily apparent. In addition, to the reduction in reactor length made possible by the use of the instant invention, the liquid and vapor distribution efficiency achieved remains highly efficient over the entire operational rate range of the reactor. Thus, uniform flow distribution is achieved over a range of large turndown ratios (this ratio being defined as the maximum flow rate through the reactor over the minimum flow rate through the reactor). This efficient and uniform distribution manifests itself by insuring higher catalyst activity at the same operating conditions and prolonged run lengths before shutdown or regeneration. While other devices may achieve uniform flow distribution, their use results in a considerable cost increment because of the excessive straight side these devices require.

Reactors of the type which may utilize the instant invention find widespread applicability in many important commercial processes involving the physical or chemical treatment of hydrocarbons and other organic materials with bodies of granular contact material. It has been found that in many of these contacting operations, a portion of the material fed to the solids bed is in the liquid phase and certain phenomena occur which are injurious to the solid contact material (or catalyst) and the contacting efficiency. One problem which is often encountered in this area involves the difficulty of getting uniform distribution of liquid throughout the solids bed.

In the past reactants have generally been introduced into the upper portion of the solids bed through common perforated distribution plates. While of some use, these plates often do not prevent maldistributions of the process stream due to the fact that there is a strong tendency for the liquid portion of the two-phase feed to fall into the catalytic reactor in a localized area while the gaseous portion is distributed uniformly, or more likely, preferentially takes paths through that portion of the catalyst bed not occuped by the liquid portion. The result of this maldistribution often leads to lower feed conversions and less efficient utilization of the catalyst comprising the bed. This maldistribution can be overcome by using plates with very small holes, but these are subject to plugging as well as excessive straight side requirements.

SUMMARY OF THE INVENTION

In contrast to the poor distribution patterns often heretofore experienced, the device of the instant invention results in highly efficient and uniform distribution of two-phase reactants throughout the catalytic contact beds. This highly desirable result is achieved by providing a plate having a multiplicity of short tubes inserted through the plate and extending above and below the plane of the plate. A like multiplicity of relatively longer tubes are also positioned within the plate and project further above said plane than do the shorter tubes. The upper ends of the longer tubes are provided with a plurality of notches, and gas caps are placed over their uppermost extremity.

In operation the improved distributor of the instant invention works as follows:

At low flow rates (i.e. at minimum feed throughputs) the flow of liquid is entirely through the short tubes with the gas flowing through the notched tubes. Uniformity of distribution is readily achieved by sizing the short tubes so that the head of liquid existing above them is at least 1½ inches. At higher flow rates the liquid builds up to the notches provided in the longer tubes and some of the liquid then begins to flow through the longer tubes. This in effect serves to "spreadout" the increased flow over a greater number of points and serves to maintain the desired uniformity of distribution. The flow through the short tubes still remains uniform and the gas phase still continues to flow through the notched tubes. Thus, the notched tubes serve two important functions; firstly, they act as gas chimneys to provide good uniformity in the distribution of the gas phase, and, secondly, they prevent the building up of the liquid level over the plate beyond a desired height. This latter feature means that reactors of shorter overall lengths may be employed since large buildups in liquid levels in the case of large turndown ratios (i.e. maximum flow rate/minimum flow rate) do not occur and, hence, do not have to be taken into account in setting the spacing between beds in plural bed reactors.

The slots in the long tubes are designed so that at maximum flow rates they take up to 50% of the total flow rate. In one embodiment of the invention, baffle plates or notched overflow boxes are provided beneath the shorter tubes to reduce the effective distance between drip points and, hence, to further aid in achieving totally uniform distribution. Furthermore, by maintaining a head of 1½ inches above the uppermost end of the shorter tubes, distribution becomes relatively insensitive to out of level variations which may occur in the transverse direction of the reactor.

It will also be appreciated by those skilled in the art that the protrusion of the tubes beneath the plane of the plate provides drip points for the liquid while at the same time prevents the liquid from running across the underside of the plate. Also, the projecting of the tubes above the plate provides a liquid height in which scale (rust or other solid debris) may settle out without plugging the tubes. In addition, by providing baffles beneath the shorter tubes an annular liquid flow onto the bed is achieved. This reduces the number of tubes required by reducing the effective distance between holes, and thus allows the instant distributor to be used for very low flow situations where the tube spacing would otherwise be too large.

Thus, it is an object of this invention to provide means and methods for uniformly distributing mixed feeds in catalytic downflow reactors, which means and methods are substantially insensitive to liquid level variations and large variations in feed throughputs.

It is an additional object of the instant invention to provide a novel distributor having very small height requirements and, hence, resulting in shorter and thus less expensive catalytic contacting reactors.

These and other objects as well as a fuller understanding of the invention will be apparent by reference to the following detailed description taken in conjunction with the accompanying drawings.

BRIEF DESCRIPTION OF THE DRAWINGS

FIG. 1 is a vertical section of a plural bed reactor employing the distribution device of the instant invention;

FIG. 2 is a plan view of the distributor device of the instant invention taken along the line 2—2 of FIG. 1;

FIG. 3 is an enlarged side elevational view of the distributor of the instant invention; and FIG. 4 is an enlarged sectional view of a specific portion of the distributor of the invention.

Referring now more particularly to FIG. 1, the instant apparatus is shown in the environment of a typical catalytic reactor. Thus, reference numeral 2 denotes a cylindrical reactor having a top 4 and a bottom 36. Reactor 2 is usually constructed of corrosion-resistant material and is normally insulated for operation at elevated temperatures. An outlet conduit 35 is provided in reactor bottom 36. An inlet flange 5 is provided for accessibility to the exterior region 3 of the reactor 2. A feed inlet conduit 6 communicates with the interior of reactor 2 through a sparger 7, which is in the form of an open pipe with a splash plate 8 attached at a distance of 2 to 16 inches from the open end of sparger 7.

The foregoing constitute conventional elements found in many catalytic reactors. According to the instant invention a novel feed distribution system is provided in the form of the assemblies indicated generally by the reference numerals 15. Assemblies 15 are comprised of a transverse portion or distribution plate 12 and a plurality of tubes 14 and 20 to be discussed in greater detail hereinafter. Distributor plate 12 is securely mounted in a substantially horizontal plane within reactor 2 in any suitable manner such as by use of circular flange 10. It will be appreciated that any other conventional supports such as channels, angles, brackets and the like may be employed to equal advantage. Distribution plate 12 is solid; that is, liquid and vapor tight except for the opening which tubes 14 and 20 form therein.

Catalytic beds 28 and 34 are located beneath the assemblies 15. While only two such beds are illustrated, it is to be appreciated that a multiplicity of beds and a multiplicity of distributor assemblies may be used in any particular reactor design.

Turning now to FIG. 2, a plan view of the distributor assembly 15 taken along the line 2—2 of FIG. 1 is therein presented. As may be seen, tubes 14 and 20 are arranged in a substantially uniform fashion across distributor plate 12. While many tube spacing configurations are employable, such as square and rectangular grid arrays, in a preferred embodiment a triangular grid array is utilized, indicated by phantom lines a, b and c. Inter-tube spacing may be on the order of about 3 inches to 12 inches and preferably about 8 inches.

An enlarged sectional view of distributor assembly 15 is shown in FIG. 3. As illustrated therein, the plurality of short tubes 20 are affixed within plate 12 in such a manner that the upper and lower ends thereof protrude above and below plate 12. Each of the tubes 20 is also provided with an overflow box 22 in the region of its lower end. Overflow boxes 22 may be affixed by means of supports 26 to either the underside of plate 12 as illustrated or, if desired, they may be similarly affixed directly to the lower portion of the tube 20. Overflow boxes 22 may be conveniently formed in a cylindrical shape with the walls of the cylinder being provided with a plurality of overflow slots 24. In operation the overflow boxes with their associated slots 24 serve to distribute the liquid flowing through tubes 20 onto bed 34 over an area of larger diameter than would be achieved otherwise. This in effect reduces the number of tubes required by reducing the effective distance between tube holes, and thus allows the instant distributor device to be utilized for very low flow situations where the tube spacing would otherwise be too large.

As heretofore indicated, plate 12 is also provided with a plurality of tubes 14, which are longer than tubes 20. The former series of tubes are provided with caps 18, which caps function to prevent feed from above entering tubes 14 directly. Tubes 14 are also provided with slots 16 at their upper ends. The function and shape of these slots will be further detailed in conjunction with the discussion of FIG. 4.

As may be seen, distributor assembly 15 is of such design that at low flow rates the flow of the liquid component of the two-phase feed is entirely through the shorter series of tubes 20. Tubes 20 are so sized and provided in such number that under the lowest design flow rate they insure a head of liquid feed of about 1 to 3 inches over their upper ends. This head is sufficient to insure that uniform flow through tubes 20 and, hence, to the catalytic bed therebelow is achieved. At higher flow rates the level of the fluid increases above the minimum level (represented by line L) to a higher level indicated by the line H. At this level some of the liquid flows through the notches in the plurality of tubes 14. This has the effect of effectively reducing the distance between drip points on the catalyst bed situated below plate 12 and, of course, contributes to the uniformity of distribution which is desired. Under these conditions the flow through the short tubes is still uniform and the gaseous components of the mixed phase feed still flow through tubes 14. Thus, the notched tubes 14 serve two purposes; they act as gas chimneys to evenly distribute the gaseous components of the mixed feed and they minimize the amount of inter-bed height (and hence the overall reactor straight side) needed in reactors which are designed to accommodate large turndown ratios.

A further advantage of the instant distribution assembly is achieved by the positioning of the tubes 20 and 14 so that their bottom portions extend past plate 12. This insures that the liquid flowing through the tubes will not flow along the underneath portion of plate 12 and, hence, maldistributions which might arise due to this phenomenon are avoided. The design of the distributor of the instant invention also allows for the settling out of scale and other solid impurities onto the upper surface of plate 12 as indicated at 21.

FIG. 4, an enlarged sectional view of two of the tubes 14, shows a preferred configuration for the slots 16. This configuration is basically in the form of a truncated triangular cutout with the base of the triangle being disposed closer to plate 12 than the truncated portion. The advantage of using such a configuration as opposed to utilizing a slot of rectangular cross-section, or one of triangular cross-section with the apex downwardly oriented, lies in the fact that the instant configuration insures greater uniformity of distribution when the liquid level above plate 12 is not parallel to it (as indicated by line L—L). This desired feature is achieved because the flow through the instant slots is proportional to the height of the head of liquid above the slot base 40 raised to a power less than one (e.g. approximately 0.5). In contrast, the flow through a rectangular slot is proportional to the height of the head raised to the 1.5 power, while that through a triangular slot having its apex oriented downwardly is proportional to the head squared. Thus, it is seen that the flow through tubes 14 is very insensitive to liquid level variations which may occur, for example, due to local surges resulting from wave action at the surface of the liquid on plate 12.

In a preferred embodiment tubes 20 have an internal diameter in the range of from about ⅜ inch to about ¾ inch and preferably about ½ inch. These tubes are preferably about 2 inches in overall length and project a distance of about 1 inch above the surface of plate 12. Tubes 14 have diameters of 1 to 2 inches and have overall lengths of about 6½ inches with a 6 inch projection above plate 12. The slots 16 in tubes 14 are about 2 inches long and are about 1 inch wide at their base and 0.25 inch wide at their narrowest portion. As hereinbefore indicated, tubes 14 and 20 are preferably arranged in a triangular fashion and the preferred distance between like tubes is in the range of from about 3 inches to about 12 inches.

As an example of the effectiveness of the instant invention, an overall reduction in reactor height of 3 to 5 percent may be realized by its utilization in a typical hydrofiner reactor designed to process about 2,000 bbl./day to about 50,000 bbl./day. In the alternative, without changing reactor height, the volume of catalyst per existing reactor can be increased by 3 to 5 percent, thereby increasing run length and decreasing reactor downtime due to catalytic exhaustion.

While the instant invention has been described in considerable detail by way of discussion and illustration, it is to be appreciated that obviously certain changes and modifications may be made without departing from the spirit of the invention. Thus, if desired, a third set of slotted tubes could be added to distribute even greater flow rates. Therefore, in determining the full scope of the invention, reference should be had to the following claims.

What is claimed is:

1. An apparatus for contacting a liquid vapor mixture with a bed of particulated solids comprising in combination a closed vessel adapted for downward flow and to contain therein a solids bed extending from a lower level to an upper level; inlet means in the upper portion of said vessel above said upper level; outlet means in the lower portion of said vessel below said lower level; a substantialy horizontal fluid distributor plate mounted in said vessel and disposed between said inlet means and said upper level of said solids bed, said plate having a first plurality of holes and a second plurality of holes; a first plurality of tubes extending above said plate and disposed in register with said first plurality of holes, said first plurality of tubes having upper ends terminating at a first level; and a second plurality of tubes longer than those comprising said first plurality, said second plurality of tubes also extending above said plate and being disposed in register with said second plurality of holes, said second plurality of tubes having upper ends removed from said plate and terminating at a second level that is further removed from said plate than said first level, and further characterized in that a slot is provided in each of said upper ends removed from said plate.

2. The apparatus of claim 1 wherein each of the tubes in said second plurality is provided with a cap to prevent the direct entry of liquid from said inlet means.

3. The apparatus of claim 2 wherein each of the tubes in said first plurality is provided with an overflow box to receive and distribute the fluid flowing through the tubes comprising said first plurality.

4. The apparatus of claims 1, 2 or 3 wherein the slots in said second plurality of tubes are in the configuration of a truncated triangle with the base of the triangle being disposed closer to said plate than is the truncated portion.

5. In a reactor of the type having a downward flow and wherein a mixed phase feed is contacted with a bed of particulated solids, an improved feed distributor assembly which comprises, a distribution plate adapted to be mounted in a substantially horizontal plane in said reactor, a first and second plurality of distribution tubes mounted in said plate and extending above said plane, the tubes in said second plurality of tubes being longer than those in said first plurality of tubes and extending further above said plane than the tubes in said first plurality, said second plurality of tubes having first and second ends wherein said first end is further removed from said plate than said second end and further characterized in that tubes thereof are provided with slots in said first ends.

6. The assembly of claim 5 wherein said first and second plurality of tubes extend below as well as above said plate.

7. The assembly of claim 6 wherein overflow boxes are provided below said plate and underneath the tubes comprising said first plurality to receive and distribute the fluid flowing through said first plurality of tubes.

8. The assembly of claims 5, 6 or 7 wherein the slots in said second plurality of tubes are in the configuration of a truncated triangle with the base of said triangle being disposed closer to said plate than is the truncated portion.

References Cited

UNITED STATES PATENTS

| | | | |
|---|---|---|---|
| 3,112,256 | 11/1963 | Young et al. | 23—288 X |
| 3,197,286 | 7/1965 | Farkas et al. | 23—288 X |
| 3,353,924 | 11/1967 | Riopelle | 23—288 |
| 3,378,349 | 4/1968 | Shirk | 23—288 |
| 3,425,810 | 2/1969 | Scott | 23—288 X |

JOSEPH SCOVRONEK, Primary Examiner

U.S. Cl. X.R.

23—285; 208—146, 264; 261—97, 113